United States Patent [19]

Cross

[11] Patent Number: 5,050,332

[45] Date of Patent: Sep. 24, 1991

[54] FISH HOOKING DEVICE

[76] Inventor: Darrel G. Cross, 4725 Chandler, Missoula, Mont. 59802

[21] Appl. No.: 561,938

[22] Filed: Aug. 2, 1990

[51] Int. Cl.⁵ .............................................. A01K 97/12
[52] U.S. Cl. .......................................... 43/15; 43/16; 43/17
[58] Field of Search .............................. 43/15, 16, 17

[56] References Cited

U.S. PATENT DOCUMENTS

| | | | |
|---|---|---|---|
| 2,551,996 | 5/1951 | Cherubini | 43/15 |
| 3,475,847 | 11/1969 | Wilson | 43/15 |
| 3,881,269 | 5/1975 | Timmons | 43/21.2 X |
| 4,262,440 | 4/1981 | Sagal | 43/16 |
| 4,407,089 | 10/1983 | Miller | 43/21.2 |
| 4,651,460 | 3/1987 | Sykes | 43/17 |

Primary Examiner—Richard K. Seidel
Assistant Examiner—Patty E. Hong
Attorney, Agent, or Firm—Richard C. Conover

[57] ABSTRACT

A fish hooking device where a rod holder is hingedly mounted on a top side of a base support member. The rod holder is spring loaded with a coil spring connected between the rod holder and the base. The rod holder being movable from a normal, generally vertical, position to a cocked, generally horizontal, position. A trigger mechanism is provided to release the cocked rod holder so that the rod holder may swing upwardly to the normal, generally vertical, position to hook the fish. An adjustable connecting means is provided for connecting the coil spring to the base. The coil spring may be adjusted to control the force acting to rotate the fishing rod upwardly, and to control the force required to release the trigger.

3 Claims, 2 Drawing Sheets

FISH HOOKING DEVICE

BACKGROUND OF THE INVENTION

This invention relates to an improved fish hooking device for catching fish. In general, this type of device includes a spring-loaded rod holder for holding a fishing rod in a cocked position with the fishing rod in a generally horizontal direction. The rod holder is connected to a trigger mechanism which releases the rod holder when a fish takes the bait. After release, the rod holder swings to a generally vertical position to hook the fish.

This type of fish hooking device is known. For example, U.S. Pat. No. 2,804,277 to Kinder and U.S. Pat. No. 3,475,847 to Wilson illustrate devices having spring-loaded rod holders provided on a portable stand and which have trigger release mechanisms for causing the rod to swing forcibly upward when a fish takes the bait. In addition to these patents, U.S. Pat. No. 4,486,968 to Gould and U.S. Pat. No. 2,551,996 to Cherobini show other fish hooking devices.

SUMMARY OF INVENTION

The present invention relates to a fish hooking device where a hinged rod holder is hingedly mounted on a top side of a base support member. The rod holder is spring loaded with a coil spring connected between the rod holder and the base. The rod holder being movable from a normal, generally vertical, position to a cocked, generally horizontal, position. A trigger mechanism is provided to release the cocked rod holder so that the rod holder may swing upwardly to the normal, generally vertical, position to hook the fish.

It is an object of the present invention to provide structure to adjust easily the spring force acting on the rod holder. The coil spring provides two functions: (a) to rotate the fishing rod upwardly upon release of the cocked rod holder to hook a fish; and (b) to set the force required to release the trigger. With the present invention, this is accomplished by providing structure for enabling a user to change the connection point of the coil spring with the base. Thus, when fishing for bigger fish, both spring tension and release pressure can be easily increased, and when fishing for smaller fish or fish having mouths which tear easily, the spring force acting on the rod holder and the force required to release the trigger can be decreased accordingly.

BRIEF DESCRIPTION OF THE DRAWINGS

In order that the invention may be clearly understood and readily carried into effect, preferred embodiments of the invention will now be described, by way of example only, with reference to the accompanying drawings wherein.

DESCRIPTION OF PREFERRED EMBODIMENT

Figure 1:
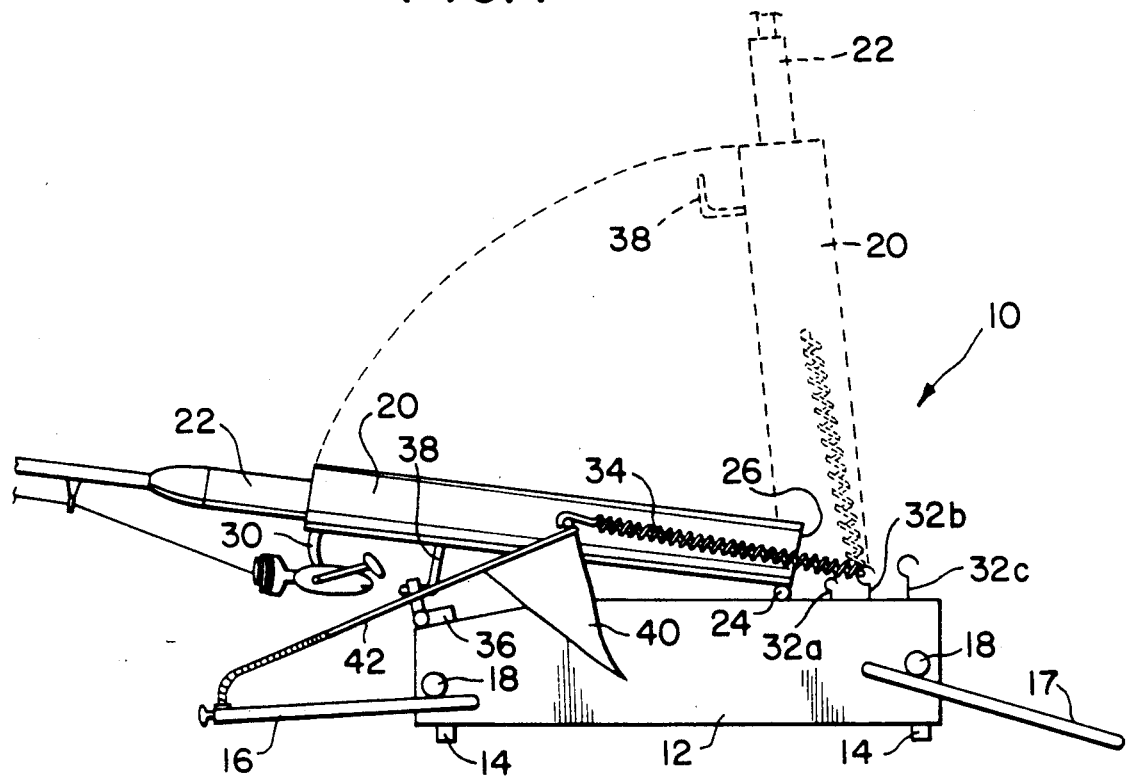
FIG. 1 is an elevational view of the automatic fishing device according to the present invention with a fishing rod partially broken away, the rod holder being shown in a cocked position.
Figure 2:
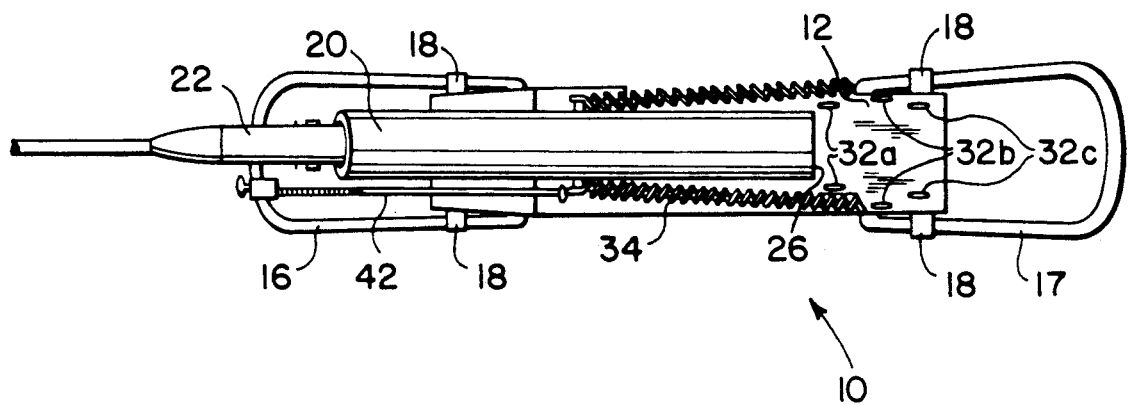
FIG. 2 is a plan view of the device shown in FIG. 1.
Figure 3:
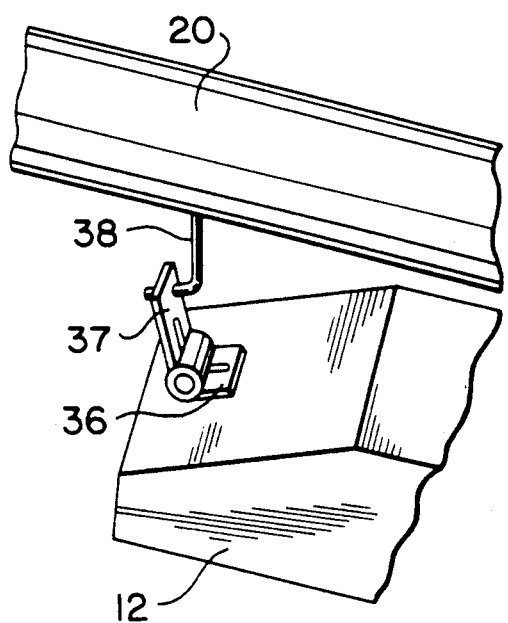
FIG. 3 is a detail perspective view of the latch dog used with the present invention.

A preferred embodiment of a fish hooking device 10 is shown in FIG. 1. The device 10 has a base 12 which has feet 14 located on the bottom thereof for resting the base on a support surface such as the ice or the ground. A generally "U" shaped forward leg 16 and a generally "U" shaped rearward leg 17 are pivotally attached to base 12 and positioned at opposite ends of base 12 for rotation from a collapsed position to an extended position where the legs 16 and 17 rest on the support surface to support the device 10. Stops 18, fixedly attached to sides of base 12, prevent further upward rotation of legs 16 and 17 to prevent legs 16 and 17 from moving away from a resting position on the support surface. This structure acts to stabilize the device 10 when a fish takes the bait, so as to prevent the device 10 from tipping over. Other legs could be used such as rods which extend telescopically from a retracted position to an extended position, or rods removably screwed into appropriate fittings on base 12.

A fishing rod holder 20, which in a preferred embodiment is a tubular member, is connected at one end by hinge 24 to base 12. A stop surface 26 on base 12 is used to stop rod holder 20 at a generally vertical position as shown in phantom in FIG. 1.

A pair of coil springs 34 are provided with each having a first end secured to the rod holder 20 in spaced apart relation to hinge 24 as shown in FIG. 1 and having a second end connected to a hook 32b as shown in FIG. 1.

The springs 34 bias rod holder 20 against stop surface 26 where the fishing rod 22 is held in a generally vertical position as shown in phantom in FIG. 1. The rod holder 20 further includes a latch pin 38 with a free end extending away from rod holder 20. A spring-loaded latch dog 36 is mounted on the top side of base 12 for movement between a normal position and a cocked position. The latch dog 36 includes a keeper hole 37 for receiving the free end of latch pin 38. When keeper hole 37 receives pin 38, the rod holder 20 is held in a cocked position with the fishing rod in a generally horizontal position as shown in FIG. 1.

When the latch pin 38 is received by the keeper hole 37, friction holds the latch dog 36 from springing to the normal position.

A series of connecting hooks 32a, 32b, and 32c are provided for each spring 34. These hooks provide an adjustable anchor for each spring 34. Connecting hooks 32 are fixedly mounted on the top of base 12 between rod holder 20 and a rearward end of base 12. In a preferred embodiment, the height of connecting hooks 32 above the top of base 12 is progressively increased as the distance from rod holder 20 to the selected hook is increased. The height of the selected connecting hook 32 above the base 12 also changes the direction of force provided by spring 34 on latch dog 36 when the rod holder 20 is being held in a cocked position. Thus, reconnecting spring 34 on a different hook 32 automatically changes the spring force of spring 34 acting on rod holder 20 to rotate the rod holder to a vertical position and at the same time adjusts the spring force of spring 34 acting to remove latch pin 38 from the keeper hole 37 of latch dog 36.

Figure 4:
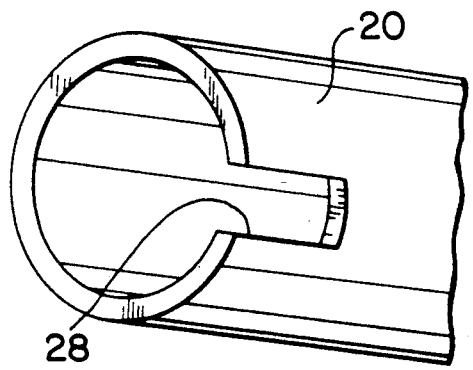
FIG. 4 is a detail perspective view of the rod holder shown in FIG. 1 at the end holding the fishing rod.

In a preferred embodiment, the rod holder 20 includes a notch 28 as shown in FIG. 4 to receive reel leg 30 as shown in FIG. 1 to prevent the fishing rod from twisting after the fishing rod is inserted into rod holder 20.

Optionally, a flag 40 can be attached to the device 10 to signal that a fish strike has occurred. Flag 40 may be mounted on a springy stem 42. The stem 42 may be secured to leg 16 as shown in FIG. 1 and sized to be retained, by a projection located on rod holder 20, in a cocked position as shown in FIG. 1. Upon release of the rod holder 20, the flag 40 springs upwardly to indicate a strike.

To use this device, a fishing rod 22 is inserted into rod holder 20. Legs 16 and 17 are extended to stabilize the base. The rod holder 20 is cocked by inserting latch pin 38 in keeper hole 37. Whenever a fish takes a hook, the tug on the fishing line will momentarily depress rod holder 20 toward base 12, thereby reducing the frictional force at latch dog 36. The latch dog 36 springs toward its normal open position leaving rod holder 20 free to rotate. Spring 34 pulls rod holder 20 upwardly, thereby jerking fishing rod 22 away from the fish and setting the hook. The tension of spring 34, if selected correctly, will hold the fishing rod 22 in holder 20 as the fish fights the hook. Flag 40 will also spring into the relaxed position since the rod holder will no longer hold it. This provides a visual indication to a fisherman that a strike has occurred.

If a different spring tension provided by spring 34 is desired, the spring 34 may be reconnected to a different hook 32. This has the result of changing both the spring force acting to rotate the rod holder 20 upwardly to hook a fish and the spring force acting on latch pin 38 in keeper hole 37 of latch dog 36, which force must be overcome before the latch pin 38 may be released from latch dog 36.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:
1. A fish hooking device comprising:
a base having a forward end and a rearward end with the forward end for resting on a support surface;
a generally "U" shaped forward leg hingedly mounted at a forward end of the base for rotation from a position below the base to an extended position beyond the forward end of the base, and a first stop means for preventing the forward leg from rotating beyond the extended position;
the forward leg when rotated to the extended position is positioned for resting on the support surface;
a generally "U" shaped rearward leg hingedly mounted at the rearward end of the base for rotation from a position below the base to an extended position behind the rearward end, and a second stop means for preventing the rearward leg from rotating beyond this extended position;
the rearward leg when rotated to its extended position is positioned for resting on the support surface;
a rod holder means for removably receiving a fishing rod;
the rod holder having an end hingedly mounted to the base to permit the fishing rod held by the rod holder to rotate from a generally horizontal position to a generally vertical position;
a spring loaded latch dog pivotally mounted to the base for movement between a normal position to a cocked position;
the rod holder further having a latch pin with a free end extending away from the rod holder;
the latch dog being provided with a keeper hole for receiving the free end of the latch pin;
a plurality of hooks mounted to the base and positioned in a staggered line extending from the rod holder toward the rearward end of the base;
a coil spring having a first end secured to the rod holder in spaced apart relation to the end hingedly mounted to the base and having a second end secured to one of the plurality of hooks;
the hooks mounted on the base being progressively sized to support the second end of the coil spring a greater distance above the base the further the hook is away from the rod holder and the hooks being staggered to prevent the coil spring from inadvertently snagging one of the hooks when the device is tripped.

2. A fish hooking device according to claim 1 further including means inhibiting a fishing rod inserted in the rod holder from twisting along the fishing rod's longitudinal axis.

3. A fish hooking device according t claim 1 further including a flag mounted on a springy stem, which stem may be caught in a flexed position whenever the rod holder is at a generally horizontal position, the stem being released whenever the rod holder moves from the generally horizontal position to the generally vertical position.

* * * * *